US012670389B2

(12) United States Patent
Todoriki et al.

(10) Patent No.: US 12,670,389 B2
(45) Date of Patent: Jun. 30, 2026

(54) NON-TRANSITORY COMPUTER-READABLE RECORDING MEDIUM FOR STORING MODEL GENERATION PROGRAM, MODEL GENERATION METHOD, AND MODEL GENERATION DEVICE

(71) Applicant: FUJITSU LIMITED, Kawasaki (JP)

(72) Inventors: Masaru Todoriki, Kita (JP); Masafumi Shingu, Mitaka (JP); Koji Maruhashi, Hachioji (JP)

(73) Assignee: Fujitsu Limited, Kawasaki (JP)

( * ) Notice: Subject to any disclaimer, the term of this patent is extended or adjusted under 35 U.S.C. 154(b) by 697 days.

(21) Appl. No.: 18/172,419

(22) Filed: Feb. 22, 2023

(65) Prior Publication Data

US 2023/0196109 A1 Jun. 22, 2023

Related U.S. Application Data

(63) Continuation of application No. PCT/JP2020/032941, filed on Aug. 31, 2020.

(51) Int. Cl.
*G06N 3/00* (2023.01)
*G06F 40/56* (2020.01)
(Continued)

(52) U.S. Cl.
CPC .............. *G06N 3/08* (2013.01); *G06F 40/56* (2020.01); *G06N 3/04* (2013.01); *G06N 3/082* (2013.01);
(Continued)

(58) Field of Classification Search
CPC ............ G06N 3/08; G06N 3/04; G06N 3/082; G06N 20/00; G06N 20/10; G06N 5/045;
(Continued)

(56) References Cited

U.S. PATENT DOCUMENTS 7,660,705 B1 * 2/2010 Meek .................... G06F 18/295
703/2
10,628,688 B1 * 4/2020 Kim ..................... G06V 20/586
(Continued)

FOREIGN PATENT DOCUMENTS

EP 3316156 A1 * 5/2018
JP 2019-056983 A 4/2019
(Continued)

OTHER PUBLICATIONS

Saumitra Mishra et al., "Local Interpretable Model-Agnostic Explanations for Music Content Analysis", Proceedings of the 18th ISMIR Conference, Suzhou, China, Oct. 23-27, 2017, pp. 537-543.*
(Continued)

*Primary Examiner* — Srirama Channavajjala
(74) *Attorney, Agent, or Firm* — Fujitsu Intellectual Property Center

(57) ABSTRACT

A non-transitory computer-readable recording medium storing a model generation program for causing a computer to perform processing including: changing first data and generating a plurality of pieces of data; calculating a plurality of values indicating a distance between the first data and each of the plurality of pieces of data; determining whether or not a value indicating uniformity of distribution of the distance between the first data and each of the plurality of pieces of data is equal to or greater than a threshold based on the plurality of values; and in a case where the value indicating the uniformity is determined to be equal to or greater than the threshold, generating a linear regression model using a result obtained by inputting the plurality of pieces of data into a machine learning model as an objective variable and using the plurality of pieces of data as explanatory variables.

15 Claims, 11 Drawing Sheets

(51) Int. Cl.

| | |
|---|---|
| *G06N 3/04* | (2023.01) |
| *G06N 3/08* | (2023.01) |
| *G06N 3/082* | (2023.01) |
| *G06N 5/01* | (2023.01) |
| *G06N 5/045* | (2023.01) |
| *G06N 20/00* | (2019.01) |

(52) U.S. Cl.
CPC .............. *G06N 5/01* (2023.01); *G06N 5/045* (2013.01); *G06N 20/00* (2019.01)

(58) Field of Classification Search
CPC ... G06N 5/01; G06N 5/04; G06N 7/01; G06F 40/56; G06F 40/205; G06F 18/214; G06F 18/295

See application file for complete search history.

(56) References Cited

U.S. PATENT DOCUMENTS

| | | | | |
|---|---|---|---|---|
| 11,210,823 | B1 * | 12/2021 | Simeonov | .......... G06Q 30/0201 |
| 2011/0238606 | A1 * | 9/2011 | Ide | .......................... G06F 17/18 |
| | | | | 706/12 |
| 2019/0073587 | A1 * | 3/2019 | Takagi | ..................... G06N 3/08 |
| 2019/0087384 | A1 | 3/2019 | Goto et al. | |
| 2019/0303795 | A1 * | 10/2019 | Khiari | ..................... G06N 5/01 |
| 2019/0325163 | A1 * | 10/2019 | Sharad | ................... G06F 21/82 |
| 2019/0325335 | A1 * | 10/2019 | Chan | ..................... G06N 20/00 |
| 2019/0325353 | A1 * | 10/2019 | Aftab | ....................... G06F 8/30 |
| 2019/0370697 | A1 | 12/2019 | Ramachandra Iyer | |
| 2020/0143252 | A1 * | 5/2020 | Dasgupta | .............. G06N 20/10 |
| 2020/0210783 | A1 * | 7/2020 | Okuno | ................. G06F 18/214 |
| 2020/0257999 | A1 | 8/2020 | Narita et al. | |
| 2020/0272853 | A1 * | 8/2020 | Zoldi | .................. G06N 3/0499 |
| 2020/0279182 | A1 * | 9/2020 | So | .......................... G06N 20/00 |
| 2021/0042590 | A1 * | 2/2021 | Watts | ................... G06N 3/0442 |
| 2021/0110288 | A1 * | 4/2021 | Poothiyot | ................. G06F 8/20 |
| 2021/0241175 | A1 * | 8/2021 | Harang | ................. G06F 18/214 |
| 2022/0044133 | A1 * | 2/2022 | Otto | ......................... G06N 5/04 |

FOREIGN PATENT DOCUMENTS

| | | |
|---|---|---|
| JP | 2019-191895 | 10/2019 |
| JP | 2020-129222 A | 8/2020 |
| JP | 2020-140466 | 9/2020 |
| WO | WO2016118979 A2 * | 7/2016 |
| WO | WO2019204072 A1 * | 10/2019 |

OTHER PUBLICATIONS

Dastan Hussen Maulud et al., "A Review on Linear Regression Comprehensive in Machine learning", JASTT, vol. 01, No. 02, pp. 140-147(2020).*

Zihan Zhou et al., "A Model-Agnostic Approach for Explaining the Predictions on Clustered Data", 2019 IEEE International Conference on Data Mining (ICDM) (2019, pp. 1528-1533).*

Andreas Messalas et al., "Model-Agnostic Interpretability with Shapley Values", 2019 10th International Conference on Information, Intelligence, Systems and Applications (IISA) (2019, pp. 1-7).*

EESR—The Extended European Search Report of European Patent Application No. 20951584.0 dated Aug. 28, 2023 [7 pages]. *Non-Patent Literature by Maxim Kovalev et al. was previously submitted in the IDS filed on Feb. 22, 2023.

Rex Ying et al: "GNNExplainer: Generating Explanations for Graph Neural Networks", Mar. 10, 2019, 12 pages, XP081528904.

Masaru Todoriki et al: "Semi-Automatic Reliable Explanations for Prediction in Graphs", 2021 IEEE 11th Annual Computing and Communication Workshop and Conference, Jan. 27, 2021, pp. 311-320, XP033887556.

Marco Tulio Ribeiro et al., "Why Should I Trust You? Explaining the Predictions of Any Classifier", ACM.ISBN 978-1-4503-4232-2/16/08, DOI: http://dx.doi.org/10.1145/2939672.2939778, Aug. 9, 2016 (Total 10 pages).

Maxim S. Kovalev et al., "SurvLIME: A Method for Explaining Machine Learning Survival Models", [online] arXiv:2003.08371v1 [cs.LG], pp. 1-29, Mar. 18, 2020 (Total 29 pages) Internet: URL:https://arxiv.org/pdf/2003.08371.pdf (Cited in ISR).

International Search Report and Written Opinion of the International Searching Authority (Form PCT/ISA/210, 220, and 237), mailed in connection with PCT/JP2020/032941 and mailed Nov. 10, 2020 (Total 10 pages).

Kartik Ahuja, et al., "Optimal Piecewise Approximations for Model Interpretation". 2019, IEEE (Year: 2019).

Marco T. Ribeiro et al., ""Why Should I Trust You?" Explaining the Predictions of Any Classifier", arXiv:1602.04938v3, Aug. 9, 2016, 10 pages.

USPTO—Non-Final Office Action mailed on Aug. 18, 2025 for U.S. Appl. No. 17/945,102 [pending].

* cited by examiner

10/11

NON-TRANSITORY COMPUTER-READABLE RECORDING MEDIUM FOR STORING MODEL GENERATION PROGRAM, MODEL GENERATION METHOD, AND MODEL GENERATION DEVICE

CROSS-REFERENCE TO RELATED APPLICATION

This application is a continuation application of International Application PCT/JP2020/032941 filed on Aug. 31, 2020 and designated the U.S., the entire contents of which are incorporated herein by reference.

FIELD

The present invention relates to a model generation technique.

BACKGROUND

While high-performance classifiers have been obtained with the progress of machine learning, there is an aspect that it is becoming difficult for humans to verify reasons and grounds for acquisition of classification results. In one aspect, it may hinder application of models obtained by execution of machine learning, such as deep learning, to mission-critical areas involving accountability for results.

For example, an algorithm called Local Interpretable Model-agnostic Explanations (LIME), which is independent of machine learning models, data formats, and machine learning model structures, has been proposed as an exemplary technique of explaining the reasons and grounds for the acquisition of the classification results.

According to the LIME, at a time of explaining a classification result output by a machine learning model f to which data x is input, a linear regression model g whose output locally approximates the output of the machine learning model f in the vicinity of the data x is generated as a model capable of interpreting the machine learning model f. For the generation of such a linear regression model g, neighborhood data z obtained by varying a part of the feature of the data x is used.

Examples of the related art include [Non-Patent Document 1]: Marco Tulio Ribeiro, Sameer Singh, Carlos Guestrin "Why Should I Trust You?" Explaining the Predictions of Any Classifier.

SUMMARY

According to an aspect of the embodiments, there is provide a non-transitory computer-readable recording medium storing a model generation program for causing a computer to perform processing, the processing including: changing first data and generating a plurality of pieces of data; calculating a plurality of values that indicates a distance between the first data and each of the plurality of pieces of data; determining whether or not a value that indicates uniformity of distribution of the distance between the first data and each of the plurality of pieces of data is equal to or greater than a threshold on a basis of the plurality of values; and in a case where the value that indicates the uniformity is determined to be equal to or greater than the threshold, generating a linear regression model by using a result obtained by inputting the plurality of pieces of data into a machine learning model as an objective variable and using the plurality of pieces of data as an explanatory variable.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

However, the LIME described above only supports data formats such as tables, images, and text as data formats in which the neighborhood data may be generated. Accordingly, in a case of generating neighborhood data for graph data, neighborhood data biasedly distributed with respect to the original graph data may be generated. Even when such neighborhood data is used, it is difficult to generate a linear regression model that approximates the machine learning model to be explained, which hinders application of the LIME to the machine learning model to which the graph data is input.

In one aspect, it is aimed to provide a model generation program, a model generation method, and a model generation device for generating a linear regression model using neighborhood data uniformly distributed with respect to original data.

A model generation program, a model generation method, and a model generation device according to the present application will be described with reference to the accompanying drawings. Note that the embodiments do not limit the disclosed technique. Additionally, each of the embodiments may be appropriately combined within a range without causing contradiction between processing contents.

First Embodiment

Figure 1:
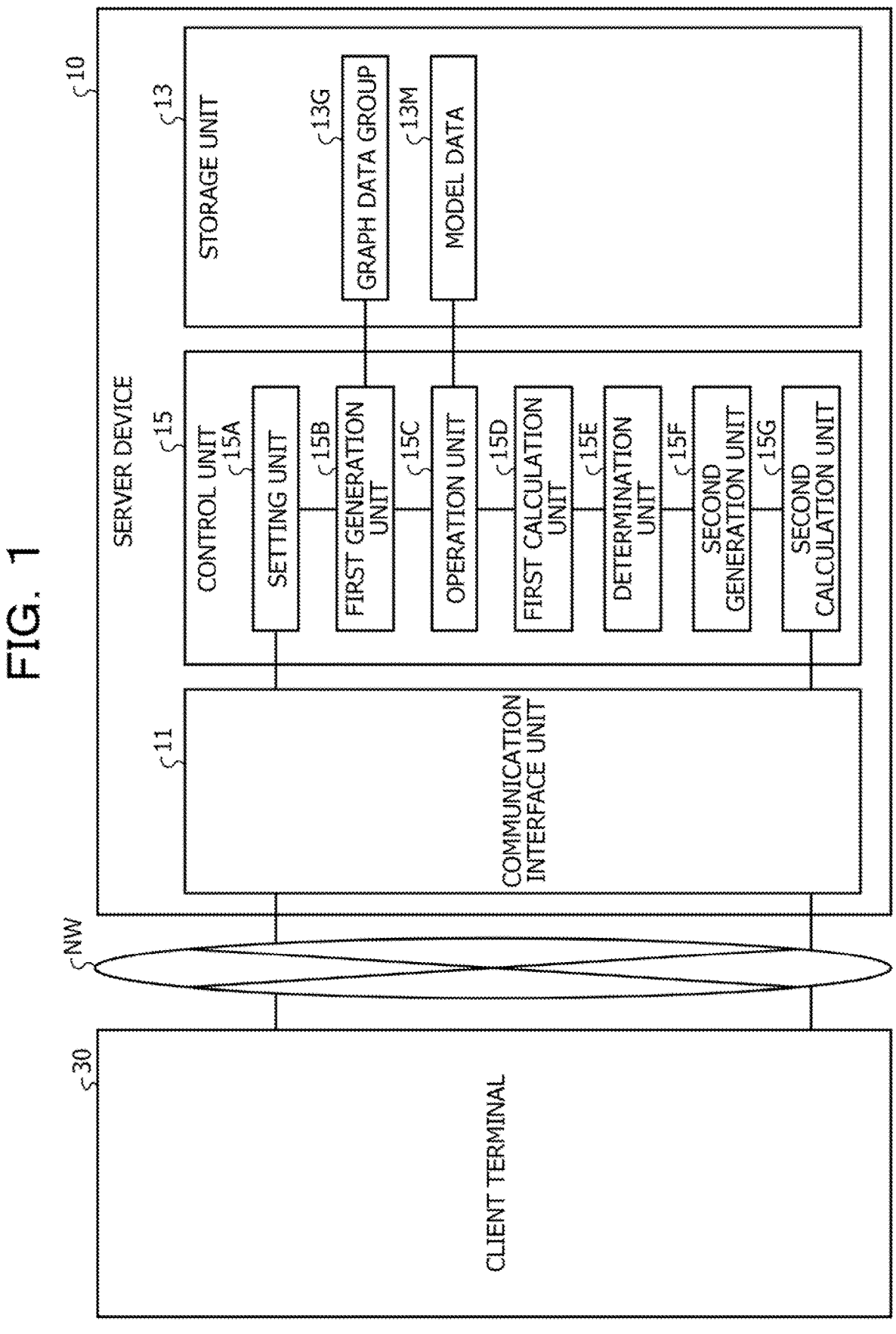
FIG. 1 is a block diagram illustrating an exemplary functional configuration of a server device according to a first embodiment.

FIG. 1 is a block diagram illustrating an exemplary functional configuration of a server device 10 according to a first embodiment. In one aspect, a system 1 illustrated in FIG. 1 provides a model generation function for generating a LIME linear regression model from original graph data to be explained. Note that, while FIG. 1 illustrates an exemplary case where the model generation function described above is provided by a client server system, it is not limited to this example, and the data generation function described above may be provided in a stand-alone manner.

As illustrated in FIG. 1, the system 1 may include the server device 10 and a client terminal 30. The server device 10 and the client terminal 30 are communicably coupled via a network NW. For example, the network NW may be any type of communication network such as the Internet, a local area network (LAN), or the like regardless of whether it is wired or wireless.

The server device 10 is an exemplary computer that provides the model generation function described above. The server device 10 may correspond to an exemplary model generation device. As one embodiment, the server device 10 may be implemented by a data generation program for implementing the model generation function described above being installed in any computer. For example, the server device 10 may be implemented as a server that provides the model generation function described above on-premises. In addition, the server device 10 may provide the model generation function described above as a cloud service by being implemented as a Software as a Service (SaaS) type application.

The client terminal 30 is an exemplary computer that receives the provision of the model generation function described above. For example, a desktop computer, such as a personal computer or the like, may correspond to the client terminal 30. This is merely an example, and the client terminal 30 may be any computer such as a laptop computer, a mobile terminal device, a wearable terminal, or the like.

As described in the background art section above, according to LIME, at a time of explaining a classification result output by a machine learning model f to which data x is input, a linear regression model g whose output locally approximates the output of the machine learning model f in the vicinity of the data x is generated as a model capable of interpreting the machine learning model f.

Figure 2:
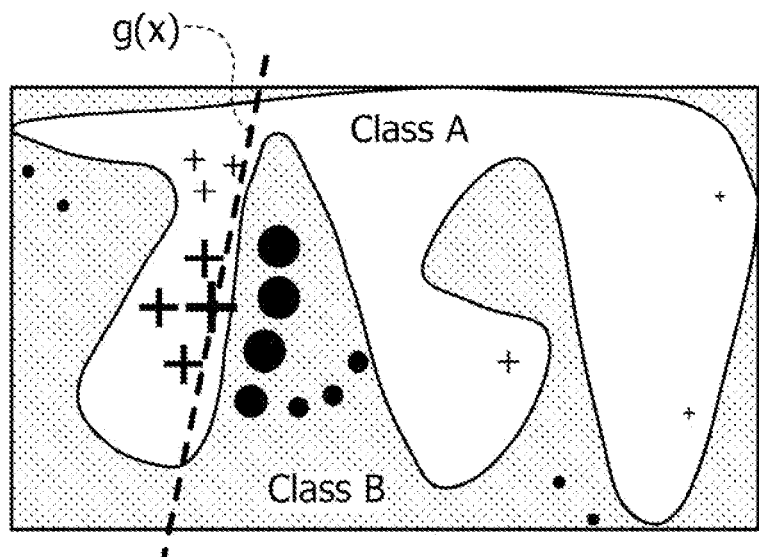
FIG. 2 is a diagram schematically illustrating a LIME algorithm.

FIG. 2 is a diagram schematically illustrating a LIME algorithm. FIG. 2 schematically illustrates a two-dimensional feature space as merely an example. Moreover, in FIG. 2, the area corresponding to class A is indicated by a white background while the area corresponding to class B is indicated by hatching in the two-dimensional feature space. Moreover, in FIG. 2, the original data x is indicated by a bold "+". Moreover, in FIG. 2, neighborhood data z with a class A label obtained by the neighborhood data z generated from the original data x being input to the machine learning model f is indicated by "+" while neighborhood data z with a class B label is indicated by "•". Moreover, in FIG. 2, a sample weight $n_x$ in which the original data z and the neighborhood data z are input to a distance function D(x, z) and a kernel function $n_x(z)$ is indicated by a size of "+" or "•". Moreover, in FIG. 2, a regression line g(x) of the linear regression model approximated by the machine learning model f is indicated by a broken line.

As merely an example, according to the LIME algorithm, descriptions regarding the output of the machine learning model f will be given according to a procedure of steps S1 to S6 set out below.

S1: Generation of the neighborhood data z

S2: Input of the neighborhood data z to the machine learning model f

S3: Calculation of a distance D

S4: Calculation of the sample weight $n_x$

S5: Generation of the linear regression model g

S6: Calculation of a partial regression coefficient

Specifically, by partially varying the feature of the data x, which is the original input instance, the neighborhood data z is generated with a specific number of samples, for example, on a scale of 100 to 10,000 (step S1). With the neighborhood data z generated in this manner being input to the machine learning model f to be explained, the output of the machine learning model f is obtained (step S2). For example, in a case where the task is class classification, a predictive probability of each class is output from the machine learning model. Furthermore, in a case where the task is regression, a predictive value corresponding to a numerical value is output. Thereafter, the original data x and the neighborhood data z are input to the distance function D(x, z) to obtain the distance D(step S3). For example, cosine similarity or the like may be used in a case where text data is input to the machine learning model f, and the L2 norm or the like may be used in a case where image data is input to the machine learning model f.

Subsequently, a kernel width σ is input to the kernel function $n_x(z)$ exemplified by the following equation (1) together with the distance D obtained in step S3, thereby obtaining the sample weight $n_x$ (step S4). Then, a linear regression model is approximated using the feature of the neighborhood data as an explanatory variable and the output of the neighborhood data as an objective variable, thereby generating the linear regression model g (step S5). For example, Ridge regression uses an objective function ξ(x) exemplified by the following equation (2). That is, the objective function ξ(x) for obtaining the linear regression model g that minimizes the sum of complexity Ω(g) of the linear regression model g and a loss function L(f, g, $n_x$) defined as the following equation (3) for the output of the linear regression model g and the machine learning model f in the vicinity of the data x is solved. Thereafter, a partial regression coefficient of the linear regression model g is calculated to output a contribution level of the feature to the output of the machine learning model f (step S6).

[Equation 1]

$$\pi_x(z) = \exp\left(\frac{-D(x, z)^2}{\sigma^2}\right) \tag{1}$$

[Equation 2]

$$\xi(x) = \operatorname*{argmin}_{g \in G} L(f, g, \pi_x) + \Omega(g) \tag{2}$$

[Equation 3]

$$L(f, g, \pi_x) = \sum_{z, z' \in Z} \pi_x(z)(f(z) - g(z'))^2 \tag{3}$$

The contribution level of the feature output in step S6 is useful in analyzing reasons and grounds for the output of the machine learning model. For example, it becomes possible to identify whether or not the trained machine learning model obtained by executing machine learning is a poor-quality machine learning model generated due to bias in training data or the like. As a result, it becomes possible to suppress usage of a poor-quality machine learning model in mission-critical areas. Furthermore, in a case where the output of the trained machine learning model contains an error, the reasons and grounds for the output of the error may be presented. In another aspect, the contribution level of the feature output in step S6 is useful in that different machine learning models, data formats, or machine learning model structures may be compared with each other using the same rule. For example, it becomes possible to select a machine learning model in terms of which trained machine learning model is essentially superior among a plurality of trained machine learning models prepared for the same task.

Here, as described in the background art section above, the LIME has an aspect that it is difficult to apply it to graph data. In other words, in the LIME, only an application programming interface (API) of a library supporting data in formats such as tables, images, and text is published as data formats in which the neighborhood data may be generated.

Under such circumstances, in the case of generating neighborhood data for graph data, neighborhood data biasedly distributed with respect to the original graph data may be generated. Even when such neighborhood data is used, it is difficult to generate a linear regression model that approximates the machine learning model to be explained, which hinders application of the LIME to the machine learning model to which the graph data is input.

For example, while examples of the machine learning model to which graph data is input include a graph neural network (GNN), a graph kernel function, and the like, it is difficult to apply the LIME to those GNN model, graph kernel model, and the like. It is conceivable to apply GNNExplainer, which outputs a contribution level of each edge of the graph input to the GNN model to the output of the GNN model, to the GNN model out of those GNN model and graph kernel model. However, since the GNNExplainer is a technique specialized for GNN models, it is difficult to apply it to a graph kernel model or another machine learning model. Under current circumstances that there is no machine learning model having decisively high performance in every task, it is unlikely that the GNNExplainer in which applicable tasks are limited is to be a standard.

In view of the above, the model generation function according to the present embodiment achieves generation of neighborhood data uniformly distributed with respect to original graph data from the aspect of achieving extension of the LIME applicable to a machine learning model using the graph data as input.

Figure 3:
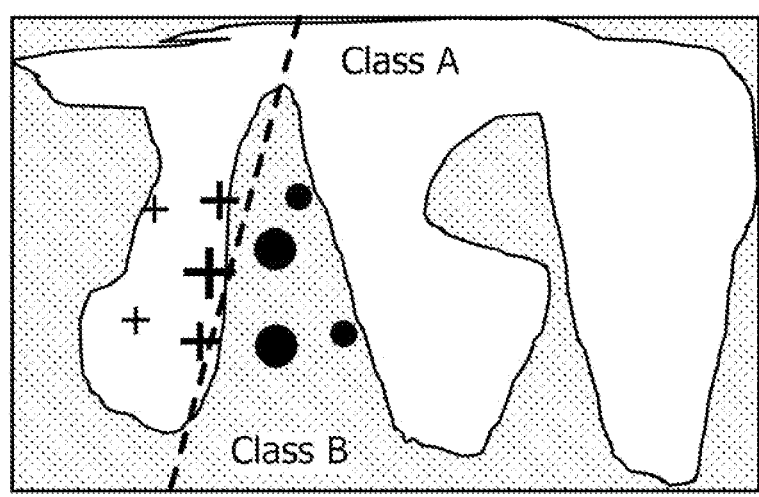
FIG. 3 is a diagram illustrating exemplary neighborhood data.
Figure 4:
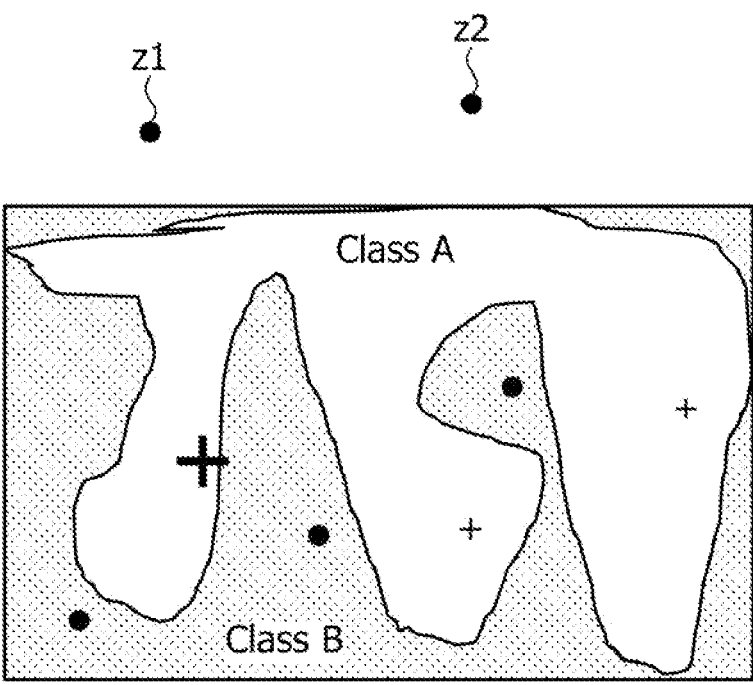
FIG. 4 is a diagram illustrating exemplary neighborhood data.

FIGS. 3 and 4 are diagrams illustrating exemplary neighborhood data. FIGS. 3 and 4 illustrate the two-dimensional feature space illustrated in FIG. 2. Moreover, FIG. 3 illustrates the neighborhood data z desirable for generating the linear regression model g, whereas FIG. 4 illustrates the neighborhood data z undesirable for generating the linear regression model g. The neighborhood data z illustrated in FIG. 3 is data assumed to be input to the machine learning model f, which is, for example, data similar to the training data used to train the machine learning model f. Moreover, the proportion of the neighborhood data z distributed in the vicinity of the original data x is high. Since such neighborhood data z is easy to identify the discrimination boundary between the class A and the class B in the vicinity of the original data x, it is suitable for generation of the linear regression model g. On the other hand, the neighborhood data z illustrated in FIG. 4 is, as exemplified by neighborhood data z1, z2, and z3, data not assumed to be input to the machine learning model f, which includes, for example, data not similar to any of the training data used to train the machine learning model f. Moreover, the proportion of the neighborhood data z distributed in the vicinity of the original data x is low. Since such neighborhood data z is difficult to identify the discrimination boundary between the class A and the class B in the vicinity of the original data x, it is unsuitable for generation of the linear regression model g.

There is an aspect that, while the neighborhood data illustrated in FIG. 3 tends to be generated with data in formats such as tables, images, and text supported by the LIME API, the neighborhood data illustrated in FIG. 4 tends to be generated in the case of the graph data not supported by the LIME API.

In addition, in a case where the neighborhood data is generated from the graph data, the distribution of the neighborhood data with respect to the original data tends to be biased as compared to the data supported by the LIME API even if data distributed in the vicinity of the original data is generated.

Figure 5:
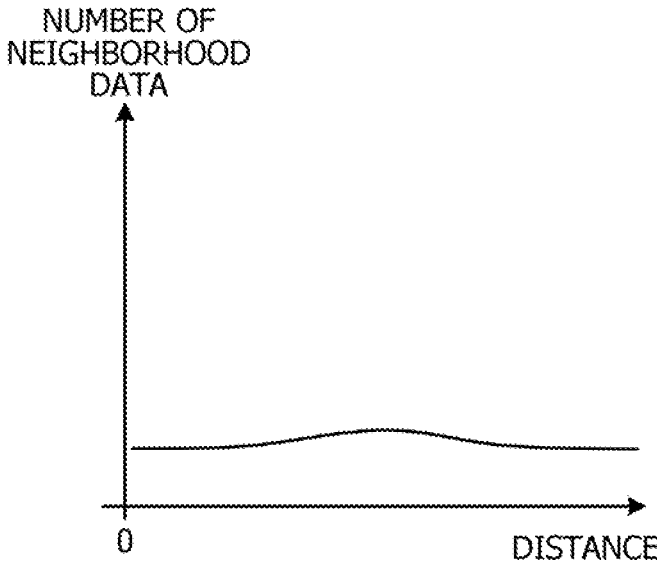
FIG. 5 is a diagram illustrating exemplary distribution of the neighborhood data.
Figure 6:
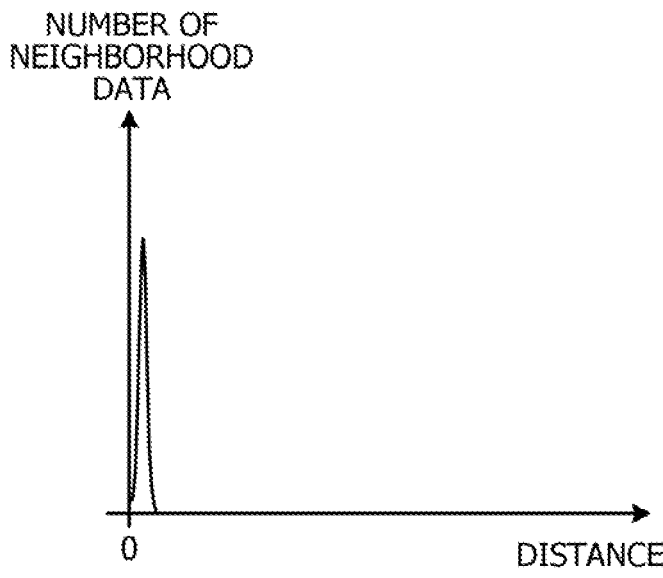
FIG. 6 is a diagram illustrating exemplary distribution of the neighborhood data.

FIGS. 5 and 6 are diagrams illustrating exemplary distribution of the neighborhood data. The vertical axes of the graphs illustrated in FIGS. 5 and 6 represent the number of pieces of neighborhood data, and the horizontal axes of the graphs represent the distance D between the original data and the neighborhood data. As illustrated in FIG. 5, in a case where the neighborhood data is uniformly distributed in the vicinity of the original data with little bias, a linear regression model that approximates the machine learning model to be explained may be generated. On the other hand, as illustrated in FIG. 6, in a case where the neighborhood data is not uniform in the vicinity of the original data and biasedly distributed in a part of the vicinity, variation of the neighborhood data to be used to generate a linear regression model tends to be insufficient. Accordingly, it is difficult to generate a linear regression model that approximates the machine learning model to be explained. In this case, the accuracy in calculating the contribution level of the feature to the output of the machine learning model f is lowered.

A functional configuration of the server device 10 having the model generation function capable of reducing the generation of such neighborhood data biasedly distributed with respect to the original graph data will be described. FIG. 1 schematically illustrates blocks corresponding to functions of the server device 10. As illustrated in FIG. 1, the server device 10 includes a communication interface unit 11, a storage unit 13, and a control unit 15. Note that FIG. 1 only illustrates an excerpt of functional units related to the model generation function described above, and a functional unit other than the illustrated ones, for example, a functional unit that an existing computer is equipped with by default or as an option may be provided in the server device 10.

The communication interface unit 11 corresponds to an example of a communication control unit that controls communication with another device, for example, the client terminal 30. As merely an example, the communication interface unit 11 is implemented by a network interface card such as a LAN card. For example, the communication interface unit 11 receives a request regarding execution of the LIME algorithm from the client terminal 30. Furthermore, the communication interface unit 11 outputs the contribution level of the feature, which is the execution result of the LIME algorithm, to the client terminal 30.

The storage unit 13 is a functional unit that stores various types of data. As merely an example, the storage unit 13 is implemented by storage, for example, internal, external, or auxiliary storage. For example, the storage unit 13 stores a graph data group 13G and model data 13M. In addition to those graph data group 13G and model data 13M, the storage unit 13 may store various types of data such as account information of a user who receives the provision of the model generation function described above.

The graph data group 13G is a data set including multiple nodes and multiple edges connecting the multiple nodes. For example, graph data included in the graph data group 13G may be training data to be used to train a machine learning model, or may be input data to be input to a trained machine learning model. Furthermore, the graph data included in the graph data group 13G may be in any format such as an adjacency matrix, a tensor, or the like.

The model data 13M is data associated with a machine learning model. For example, in a case where the machine learning model is a neural network, the model data 13M may include parameters of the machine learning model such as a weight, a bias, and the like of each layer as well as a layer structure of the machine learning model such as a neuron, a synapsis, and the like of each layer including an input layer, a hidden layer, and an output layer forming the machine learning model. Note that, while parameters initially set by a random number are stored as exemplary parameters of the machine learning model at a stage before the model machine learning is carried out, trained parameters are saved at a stage after the model machine learning is carried out.

The control unit 15 is a processing unit that takes overall control of the server device 10. For example, the control unit 15 is implemented by a hardware processor. As illustrated in FIG. 1, the control unit 15 includes a setting unit 15A, a first generation unit 15B, an operation unit 15C, a first calculation unit 15D, a determination unit 15E, a second generation unit 15F, and a second calculation unit 15G.

The setting unit 15A receives various settings associated with the LIME algorithm. In one aspect, the setting unit 15A may start a process when a request regarding execution of the LIME algorithm is received from the client terminal 30. At this time, the setting unit 15A may receive, via the client terminal 30, designation of the machine learning model f and the original graph data x to be explained. In addition, the setting unit 15A may also automatically make a selection from output of a machine learning model that is being trained or has been trained, such as training data or input data with incorrect labels or numerical values. After the machine learning model and the original graph data to be obtained are identified in this manner, the setting unit 15A obtains the original graph data x to be obtained from the graph data group 13G and the machine learning model f to be explained from the model data 13M stored in the storage unit 13.

Then, the setting unit 15A sets the distance function D(x, z) and the kernel width σ to be used by the LIME algorithm. For those distance function D(x, z) and kernel width σ, system settings made by a developer of the model generation function described above or the like may be automatically applied, or user settings may be received from the client terminal 30. For such a distance function D(x, z), a distance function for graph data or the like, such as a graph kernel, may be set. Examples thereof include a distance based on graph division, an edit distance of an adjacency matrix or an incidence matrix, a distance based on cosine similarity, and the like. Other examples include random walk kernels, shortest paths, graphlet kernels, Weisfeiler-Lehmen kernels, GraphHopper kernels, graph convolutional networks, neural message passing, GraphSAGE, SplineCNN, k-GNN, and the like.

The first generation unit 15B generates the neighborhood data z from the original graph data x. Here, while any method may be applied to the generation of the neighborhood data, as merely an example, the first generation unit 15B may use the LIME API that publishes a library for generating neighborhood data for tabular data to generate the neighborhood data. For example, an exemplary case will be described where the first generation unit 15B uses an adjacency matrix as merely an example of a graph data representation method. In this case, the LIME API for tabular data is applied while elements of the adjacency matrix are regarded as features. Specifically, 0 or 1 values of the elements of the adjacency matrix are randomly inverted to create an adjacency matrix different from the original adjacency matrix.

Such neighborhood data generation is repeated until the following conditions are satisfied. As merely an example, the first generation unit 15B calculates a difference between, among the total number of pieces of neighborhood data generated so far, the number of pieces of neighborhood data corresponding to the positive example output of the machine learning model f and the number of pieces of neighborhood data corresponding to the negative example output of the machine learning model f. Then, the first generation unit 15B determines whether or not the difference in the number of pieces of neighborhood data between the positive and negative examples is equal to or smaller than a threshold. At this time, if the difference in the number of pieces of neighborhood data between the positive and negative examples is not equal to or smaller than the threshold, it may be identified that the positive and negative examples are not equal. In this case, the first generation unit 15B repeats the neighborhood data generation. For example, in a case where either the number of pieces of positive example neighborhood data or negative example neighborhood data has reached the threshold, for example, $N_{max}/2+\delta/2$, the first generation unit 15B generates deficient positive example or negative example neighborhood data that has not reached the threshold. On the other hand, the first generation unit 15B randomly generates neighborhood data in a case where none of them has reached the threshold. Furthermore, if the difference in the number of pieces of neighborhood data between the positive and negative examples is equal to or smaller than the threshold, it may be identified that the positive and negative examples are equal. In this case, the first generation unit 15B determines whether or not the total number of pieces of neighborhood data has reached a threshold, for example, $N_{max}$. Then, in a case where the total number of pieces of neighborhood data has not reached the threshold $N_{max}$, it may be identified that the total number of pieces of neighborhood data is insufficient for generating a linear regression model. In this case, the first generation unit 15B repeats the neighborhood data generation. On the other hand, in a case where the total number of pieces of neighborhood data has reached the threshold $N_{max}$, it may be identified that the total number of pieces of neighborhood data is sufficient for generating a linear regression model. In this case, the neighborhood data generation is terminated.

The operation unit 15C controls operation of the machine learning model f. In one aspect, when neighborhood data z is generated by the first generation unit 15B, the operation unit 15C inputs the neighborhood data z to the machine learning model f to obtain an output of the machine learning model f.

The first calculation unit 15D calculates a distance between the original graph data x and the neighborhood data z. In one aspect, the first calculation unit 15D inputs the original graph data x to be explained and the neighborhood data z generated by the first generation unit 15B into the distance function D(x, z) set by the setting unit 15A, thereby calculating the distance D.

The determination unit 15E determines whether or not a value indicating uniformity of distribution of multiple distances is equal to or higher than a threshold based on distribution of distances between the original graph data x and multiple pieces of neighborhood data z. For example, as merely an example of the distance uniformity determination, a chi-square test or the like may be used. Note that, instead of the value indicating the uniformity described above, a degree of bias or a degree of variation may be used for the determination.

According to the chi-square test, it is possible to determine whether or not one-dimensional N pseudorandom number sequences $x_0, x_1, \ldots, x_{(n-1)}$ are uniform pseudorandom number sequences by verifying whether the frequency distribution has an equal probability property. For example, a range of values taken by the pseudorandom number sequence $x_0, x_1, \ldots, x_{(n-1)}$ is classified into k equally spaced sections to obtain the number of random numbers $\{f_1, f_2, \ldots, f_k\}$ in each section. At this time, if the pseudorandom number sequence $x_0, x_1, \ldots, x_{(n-1)}$ is uniform, the $X^2$ statistic asymptotically approaches the $X^2$ distribution with a degree of freedom (k−1) as expressed by the following equation (4).

[Equation 4]

$$\chi^2 = \sum_{i=1}^{k} \frac{\left(f_i - \frac{N}{k}\right)^2}{\frac{N}{k}} \qquad (4)$$

Here, a null hypothesis $H_0$ is set as follows. For example, a hypothesis that the pseudorandom number sequence is uniform is set as the null hypothesis $H_0$. Under such a null hypothesis $H_0$, the following determination is made when $X^2_{k-1}(\alpha)$ is set as a confidence coefficient $\alpha$ point ($\alpha$=0.05, significance level 5%, etc.) of the $X^2$ distribution with the degree of freedom (k−1) for the $x^2$ statistic. Note that, while 5% is used as an example of the significance level here, another value such as 10% or the like may be used.

$X^2 \leq X^2_{k-1}(\alpha)$: It is assumed that the null hypothesis $H_0$ is adopted and the pseudorandom number sequence is uniform.

$X^2 > X^2_{k-1}(\alpha)$: It is assumed that the null hypothesis $H_0$ is rejected and the pseudorandom number sequence is not uniform.

From the above, when the chi-square statistic $X^2$ is equal to or less than the significance level, which is when the null hypothesis $H_0$ is adopted, it may be identified that the distance uniformity test is passed. On the other hand, when the chi-square statistic $X^2$ is not equal to or less than the significance level, which is when the null hypothesis $H_0$ is rejected, it may be identified that the distance uniformity test is not passed.

Here, if the cumulative number of failures in the distance uniformity test is less than a threshold, for example, the failure upper limit $Fail_{max}$, a retry is performed from the setting of the distance function D(x, z) and the kernel width σ. At this time, the setting unit 15A may recommend a setting related to the kernel width σ, or may automatically set the kernel width σ. In other words, the kernel width σ may be adjusted based on the distribution condition of the neighborhood data at the time of testing.

The second generation unit 15F generates a linear regression model using a result obtained by inputting multiple pieces of neighborhood data into the machine learning model f as an objective variable and the multiple pieces of neighborhood data as explanatory variables. As merely an example, the second generation unit 15F may generate the linear regression model g according to the objective function $\xi(x)$ exemplified by the equation (2) mentioned above. That is, the linear regression model g may be obtained by optimizing the objective function $\xi(x)$ for obtaining the linear regression model g that minimizes the sum of complexity $\Omega(g)$ of the linear regression model g and the loss function $L(f, g, n_x)$ of the equation (3) mentioned above for the output of the linear regression model g and the machine learning model f in the vicinity of the data x.

The second calculation unit 15G calculates a contribution level of the feature to the output of the machine learning model f. As merely an example, the second calculation unit 15G may calculate the contribution level of the feature to the output of the machine learning model f by calculating a partial regression coefficient of the linear regression model g generated by the second generation unit 15F. The contribution level of the feature obtained in this manner may be output to the client terminal 30.

Figure 7:
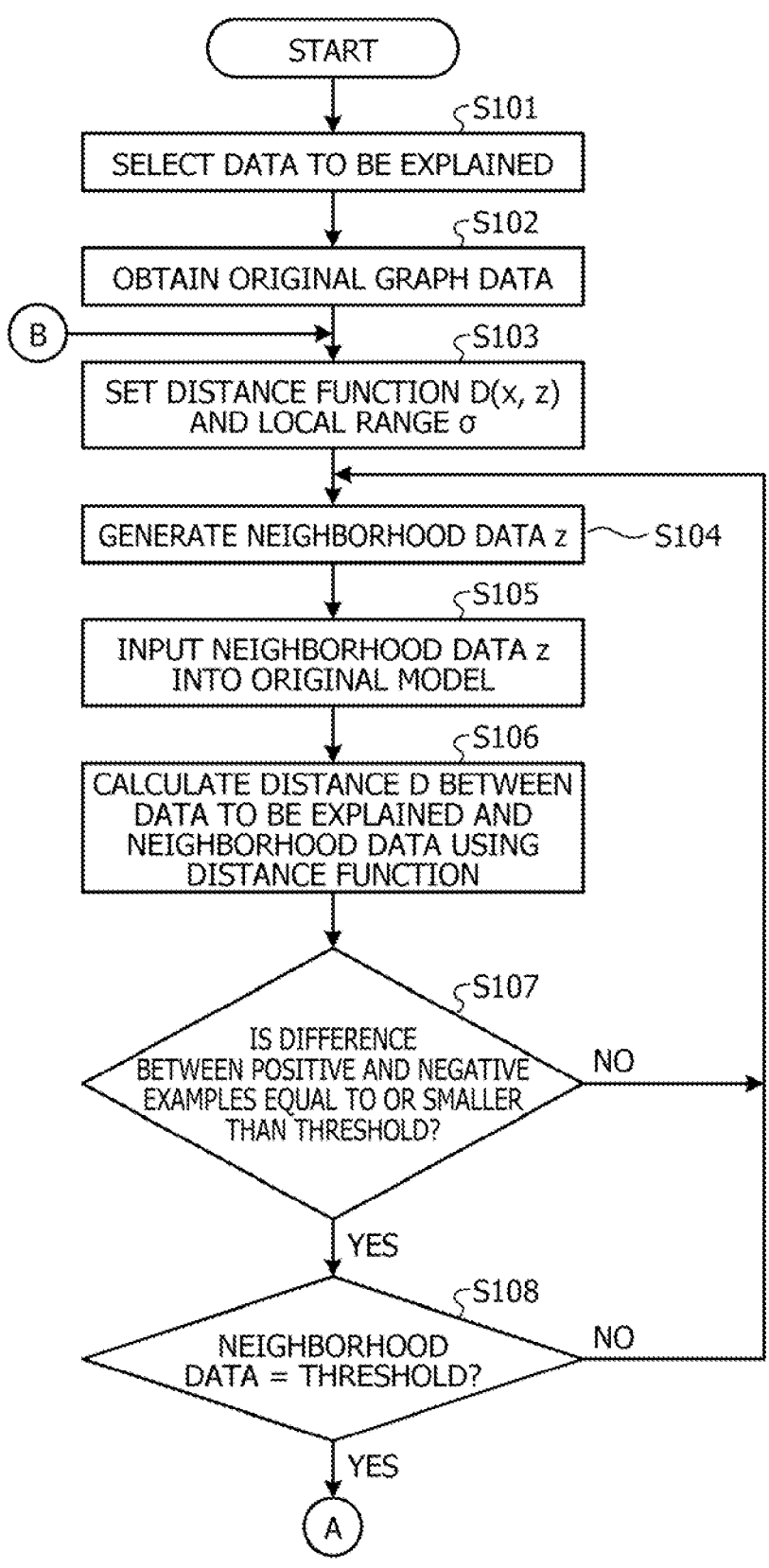
FIG. 7 is a flowchart (1) illustrating a procedure of a model generation process according to the first embodiment.
Figure 8:
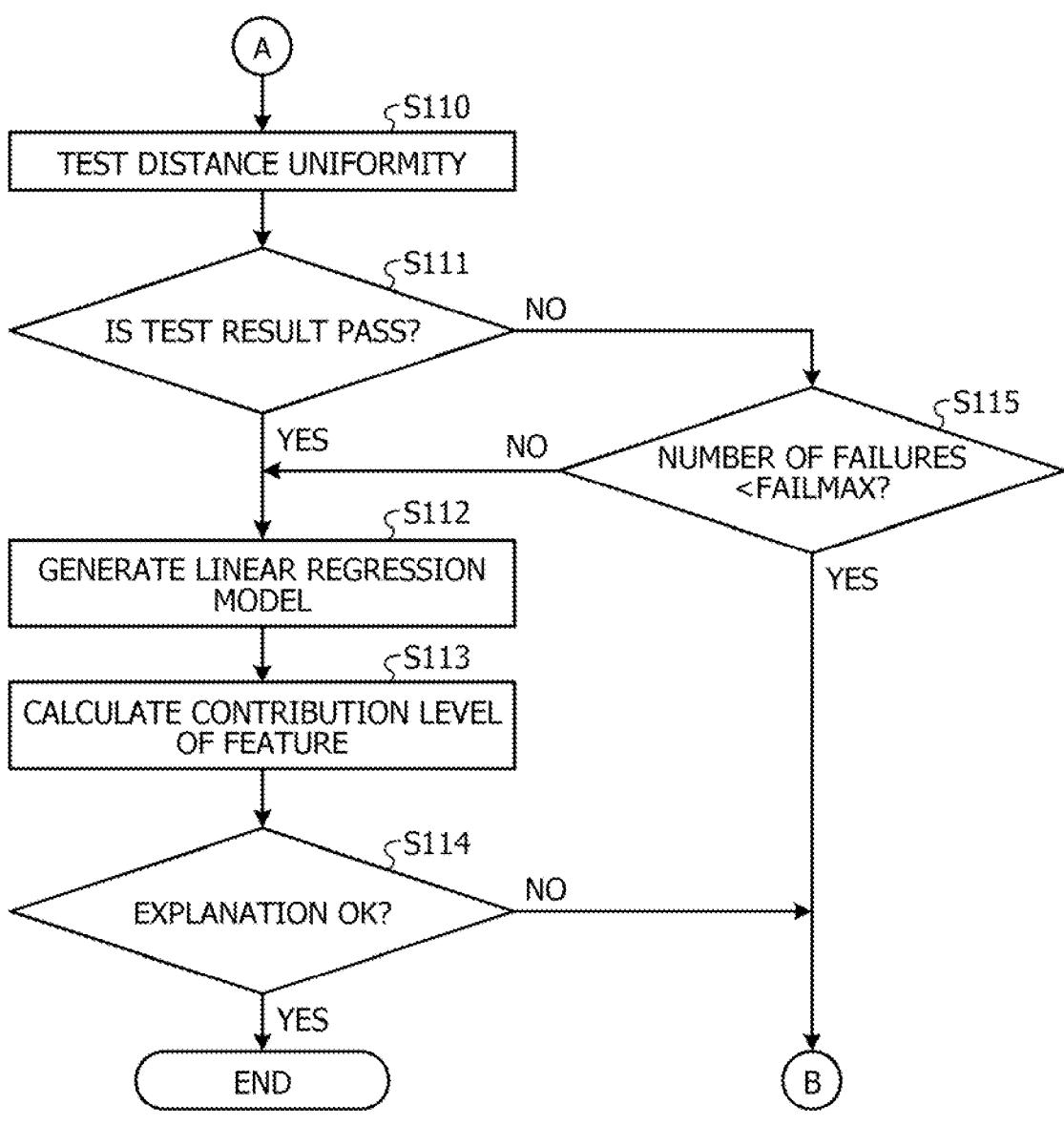
FIG. 8 is a flowchart (2) illustrating the procedure of the model generation process according to the first embodiment.

FIGS. 7 and 8 are flowcharts illustrating a procedure of the model generation process according to the first embodiment. As merely an example, this process starts when a request regarding execution of the LIME algorithm is received from the client terminal 30.

As illustrated in FIG. 7, the setting unit 15A receives, via the client terminal 30, designation of the machine learning model f and the original graph data x to be explained (step S101). Subsequently, the setting unit 15A obtains the machine learning model f and the original graph data x to be explained for which the designation is received in step S101 (step S102).

Then, the setting unit 15A sets the distance function D(x, z) and the kernel width σ to be used by the LIME algorithm (step S103). Subsequently, the first generation unit 15B generates the neighborhood data z from the original graph data x obtained in step S102 (step S104).

Thereafter, the operation unit 15C inputs the neighborhood data z generated in step S104 into the machine learning model f, thereby obtaining an output of the machine learning model f (step S105). Subsequently, the first calculation unit 15D inputs the original graph data x obtained in step S102 and the neighborhood data z generated in step S104 to the distance function D(x, z) set in step S103, thereby calculating the distance D(step S106).

Then, the first generation unit 15B determines whether or not the difference in the number of pieces of neighborhood data between positive and negative examples is equal to or smaller than a threshold (step S107). At this time, if the difference in the number of pieces of neighborhood data between the positive and negative examples is not equal to or smaller than the threshold (No in step S107), it may be identified that the positive and negative examples are not equal. In this case, the process proceeds to step S104. That is, if either the number of pieces of positive example neighborhood data or negative example neighborhood data has reached the threshold, for example, $N_{max}/2+\delta/2$, the first generation unit 15B generates deficient positive example or negative example neighborhood data that has not reached the threshold, whereas it randomly generates neighborhood data if none of them has reached the threshold.

Furthermore, if the difference in the number of pieces of neighborhood data between the positive and negative examples is equal to or smaller than the threshold (Yes in step S107), it may be identified that the positive and negative examples are equal. In this case, the first generation unit 15B determines whether or not the total number of pieces of neighborhood data has reached a threshold, for example, $N_{max}$ (step S108).

Then, if the total number of pieces of neighborhood data has not reached the threshold $N_{max}$ (No in step S108), it may be identified that the total number of pieces of neighborhood data is insufficient for generating a linear regression model. In this case, the first generation unit 15B proceeds to step S104, and repeats the neighborhood data generation.

On the other hand, if the total number of pieces of neighborhood data has reached the threshold $N_{max}$ (Yes in step S108), it may be identified that the total number of pieces of neighborhood data is sufficient for generating a linear regression model. In this case, as illustrated in FIG. 8, the determination unit 15E carries out a distance uniformity test, for example, calculation of the chi-square statistic $X^2$, based on each distance between the original graph data x obtained in step S102 and the multiple neighborhood data z obtained by the repetition of step S104 (step S110).

Here, if the chi-square statistic $X^2$ is equal to or less than the significance level in the test in step S110, which is if the null hypothesis $H_0$ is adopted (Yes in step S111), it may be identified that the distance uniformity test is passed. In this case, the second generation unit 15F generates a linear regression model using a result obtained by inputting multiple pieces of neighborhood data into the machine learning model f as an objective variable and the multiple pieces of neighborhood data as explanatory variables (step S112).

Thereafter, a partial regression coefficient of the linear regression model g generated by the second generation unit 15F is calculated, whereby the contribution level of the feature to the output of the machine learning model f is calculated (step S113). Then, if an explanation OK checking operation is performed for the contribution level of the feature calculated in step S113 (Yes in step S114), the process is terminated. Note that, if an explanation NG checking operation is performed for the contribution level of the feature calculated in step S113 (No in step S114), the process returns to step S103.

Note that, if the chi-square statistic $X^2$ is not equal to or less than the significance level in the test in step S110, which is if the null hypothesis $H_0$ is rejected (No in step S111), it may be identified that the distance uniformity test is not passed. In this case, if the cumulative number of failures in the distance uniformity test is less than a threshold, for example, the failure upper limit $Fail_{max}$ (Yes in step S115), a retry is performed from the setting of the distance function $D(x, z)$ and the kernel width $\sigma$. At this time, it is also possible to automatically set a distance function different from the distance function used when the distance uniformity test fails or to output recommendation of a different distance function to the client terminal 30. On the other hand, if the cumulative number of failures in the distance uniformity test has reached the threshold (No in step S115), the retry of the neighborhood data generation is terminated, and the process proceeds to step S112.

As described above, when the distribution of distances between the original graph data and multiple pieces of neighborhood data is uniform, the model generation function according to the present embodiment generates a linear regression model that locally approximates the machine learning model from the multiple pieces of neighborhood data. For example, in a case where the neighborhood data z is not uniform in the vicinity of the original graph data x and biasedly distributed in a part of the vicinity as illustrated in FIG. 6, generation of the linear regression model may be suppressed. On the other hand, in a case where the neighborhood data z is uniformly distributed in the vicinity of the original graph data x with little bias as illustrated in FIG. 5, the linear regression model may be generated. Therefore, according to the model generation function according to the present embodiment, it become possible to achieve extension of the LIME applicable to graph data.

Figure 9:
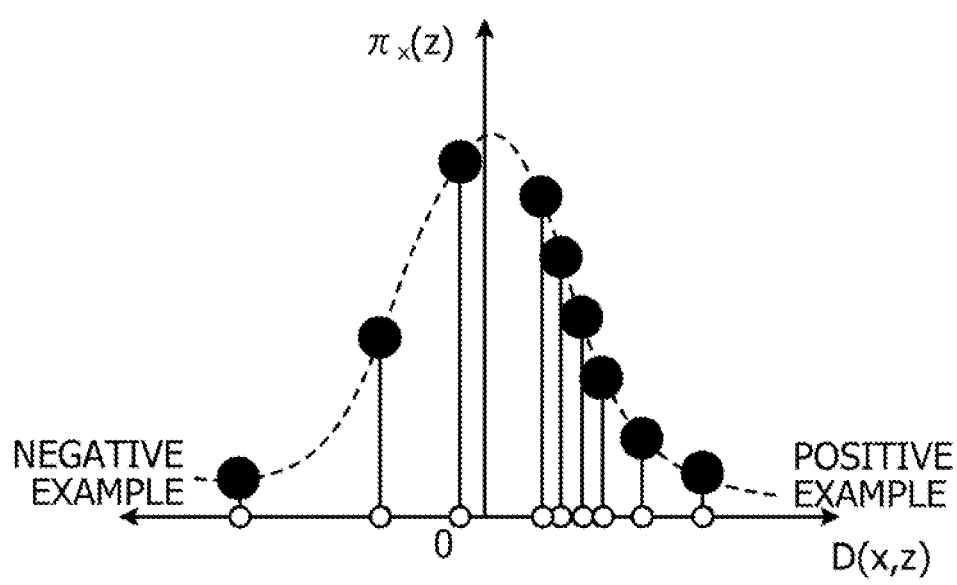
FIG. 9 is a diagram illustrating exemplary distribution of the neighborhood data.
Figure 10:
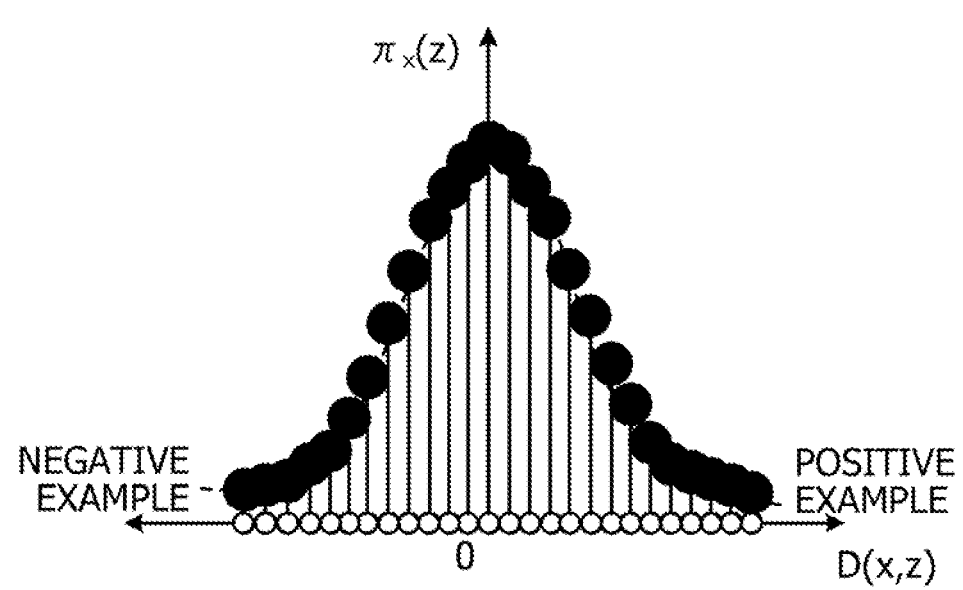
FIG. 10 is a diagram illustrating exemplary distribution of the neighborhood data.

Moreover, the model generation function according to the present embodiment controls whether or not to generate a linear regression model depending on whether or not the difference in the number of pieces of neighborhood data between positive and negative examples is equal to or smaller than a threshold. FIGS. 9 and 10 are diagrams illustrating exemplary distribution of the neighborhood data. The vertical axes of the graphs illustrated in FIGS. 9 and 10 represent $n_x(Z)$. Furthermore, the horizontal axes of the graphs represent the distance $D(x, z)$. Here, the distance D of the neighborhood data z for which the output of the machine learning model f is a positive example and the distance D of the neighborhood data z for which the output of the machine learning model f is a negative example are plotted with the vertical axis of the graph symmetrically divided. For example, generation of the linear regression model may be suppressed when the number of pieces of positive example neighborhood data and the number of pieces of negative example neighborhood data are not equal as illustrated in FIG. 9. On the other hand, the linear regression model may be generated when the number of pieces of positive example neighborhood data and the number of pieces of negative example neighborhood data are equal as illustrated in FIG. 10.

Second Embodiment

Incidentally, while the embodiment related to the disclosed device has been described above, the present invention may be carried out in a variety of different modes apart from the embodiment described above. Thus, hereinafter, another embodiment included in the present invention will be described.

Furthermore, each of the illustrated components in each of the devices is not necessarily physically configured as illustrated in the drawings. That is, specific modes of distribution and integration of the individual devices are not limited to those illustrated, and all or a part of the devices may be configured by being functionally or physically distributed or integrated in any unit depending on various loads, use situations, and the like. For example, the setting unit 15A, the first generation unit 15B, the operation unit 15C, the first calculation unit 15D, the determination unit 15E, the second generation unit 15F, or the second calculation unit 15G may be coupled via a network as an external device of the server device 10. Furthermore, each of different devices may include the setting unit 15A, the first generation unit 15B, the operation unit 15C, the first calculation unit 15D, the determination unit 15E, the second generation unit 15F, or the second calculation unit 15G, and may be connected to a network to cooperate with each other, whereby the functions of the server device 10 described above may be implemented.

Furthermore, various kinds of processing described in the first and second embodiments may be achieved by a computer such as a personal computer, a workstation, or the like executing a program prepared in advance. In view of the above, hereinafter, an exemplary computer that executes a model generation program having functions similar to those in the first and second embodiments will be described with reference to FIG. 11.

Figure 11:
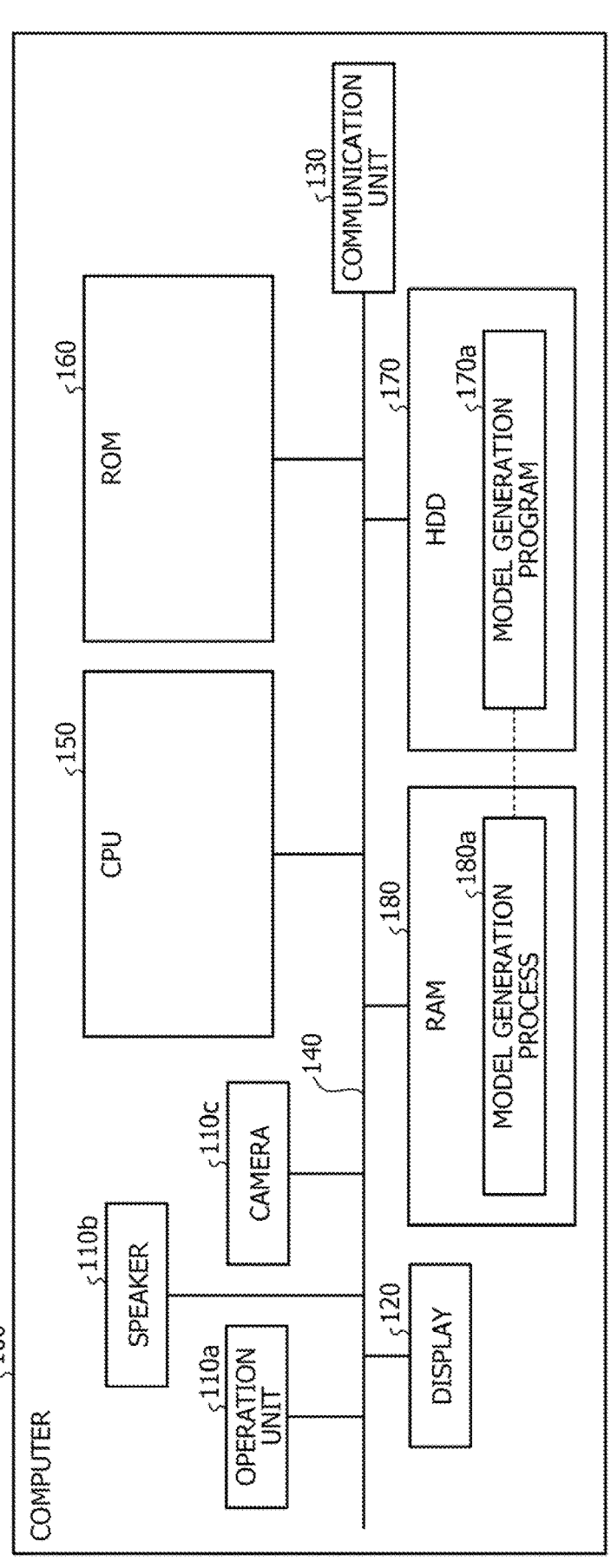
FIG. 11 is a diagram illustrating an exemplary hardware configuration of a computer.

FIG. 11 is a diagram illustrating an exemplary hardware configuration of a computer. As illustrated in FIG. 11, a computer 100 includes an operation unit 110a, a speaker 110b, a camera 110c, a display 120, and a communication unit 130. Moreover, the computer 100 includes a central processing unit (CPU) 150, a read-only memory (ROM) 160, a hard disk drive (HDD) 170, and a random access memory (RAM) 180. Those individual units 110 to 180 are coupled via a bus 140.

As illustrated in FIG. 11, the HDD 170 stores a model generation program 170a having functions similar to those of the setting unit 15A, the first generation unit 15B, the operation unit 15C, the first calculation unit 15D, the determination unit 15E, the second generation unit 15F, and the second calculation unit 15G indicated in the first embodiment described above. The model generation program 170a may be integrated or separated in a similar manner to the individual components of the setting unit 15A, the first generation unit 15B, the operation unit 15C, the first calculation unit 15D, the determination unit 15E, the second generation unit 15F, and the second calculation unit 15G illustrated in FIG. 1. In other words, all pieces of data indicated in the first embodiment described above are not necessarily stored in the HDD 170, and it is sufficient if data for use in processing is stored in the HDD 170.

Under such an environment, the CPU 150 reads the model generation program 170a from the HDD 170, and then loads it into the RAM 180. As a result, the model generation program 170a functions as a model generation process 180a as illustrated in FIG. 11. The model generation process 180a loads various kinds of data read from the HDD 170 into the area assigned to the model generation process 180a in the storage area included in the RAM 180, and executes various processes using those various kinds of loaded data. For example, examples of the processes to be executed by the model generation process 180a include the processes illustrated in FIGS. 7 and 8 and the like. Note that all the processing units indicated in the first embodiment described above do not necessarily operate in the CPU 150, and it is sufficient if a processing unit corresponding to processing to be executed is virtually implemented.

Note that the model generation program 170a described above is not necessarily stored in the HDD 170 or the ROM 160 from the beginning. For example, each program is stored in a "portable physical medium" such as a flexible disk, which is what is called an FD, a compact disc read only memory (CD-ROM), a digital versatile disc (DVD), a magneto-optical disk, an integrated circuit (IC) card, or the like to be inserted into the computer 100. Then, the computer 100 may obtain each program from those portable physical media to execute it. Furthermore, each program may be stored in another computer, server device, or the like coupled to the computer 100 via a public line, the Internet, a local area network (LAN), a wide area network (WAN), or the like, and the computer 100 may obtain each program from them to execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a model generation program for causing a computer to perform processing, the processing comprising:
  generating a plurality of perturbed pieces of data as neighborhood data from first data by applying a Local Interpretable Model-agnostic Explanations (LIME) algorithm to the first data to change features of the first data;
  obtaining a plurality of values by calculating, for each perturbed piece of data of the plurality of perturbed pieces of data, a value that indicates a distance between the first data and the each perturbed piece of data for generating a weighted linear regression model;
  performing a distance uniformity test on a basis of the plurality of values, by determining, for each value of the plurality of values, whether or not the each value is equal to or greater than a threshold; and
  in a case where the value that indicates the uniformity is determined to be equal to or greater than the threshold, generating a linear regression model by using a result obtained by inputting the plurality of perturbed pieces of data into a machine learning model as an objective variable and using the plurality of perturbed pieces of data as an explanatory variable, wherein
  the determining includes further determining whether or not a difference between a number of first values and a number of second values included in the result obtained by inputting the plurality of perturbed pieces of data into the machine learning model is equal to or smaller than a threshold, and
  the generating the linear regression model includes executing the generation of the linear regression model in a case where the difference between the number of the first values and the number of the second values is determined to be equal to or smaller than the threshold.

2. The non-transitory computer-readable recording medium according to claim 1, wherein the calculating includes calculating the plurality of values that indicates the distance on a basis of a graph kernel function.

3. The non-transitory computer-readable recording medium according to claim 1, wherein
  the generating the plurality of pieces of data includes generating new data and adding the new data to the plurality of perturbed pieces of data in a case where the value that indicates the uniformity is smaller than the threshold, and
  the determining includes further determining whether or not a value that indicates uniformity of distribution of a distance between the first data and each of the plurality of perturbed pieces of data to which the new data is added is equal to or greater than a threshold.

4. The non-transitory computer-readable recording medium according to claim 1, wherein the calculating includes changing a distance function used to calculate the plurality of values that indicates the distance in a case where the value that indicates the uniformity is smaller than the threshold.

5. The non-transitory computer-readable recording medium according to claim 1, the processing further including: calculating a partial regression coefficient of the linear regression model as a contribution level of a feature included in the plurality of perturbed pieces of data to an output of the machine learning model.

6. A model generation method implemented by processor circuitry of a computer, the model generation method comprising:

the processor circuitry generating a plurality of perturbed pieces of data as neighborhood data from first data by applying a Local Interpretable Model-agnostic Explanations (LIME) algorithm to the first data to change features of the first data;

the processor circuitry obtaining a plurality of values by calculating, for each perturbed piece of data of the plurality of perturbed pieces of data, a value that indicates a distance between the first data and the each perturbed piece of data for generating a weighted linear regression model;

performing a distance uniformity test on a basis of the plurality of values, by determining, for each value of the plurality of values, whether or not the each value is equal to or greater than a threshold; and in a case where the value that indicates the uniformity is determined to be equal to or greater than the threshold, generating, in the processor circuitry of the computer, a linear regression model by using a result obtained by inputting the plurality of perturbed pieces of data into a machine learning model as an objective variable and using the plurality of perturbed pieces of data as an explanatory variable, wherein the determining includes further determining whether or not a difference between a number of first values and a number of second values included in the result obtained by inputting the plurality of perturbed pieces of data into the machine learning model is equal to or smaller than a threshold, and the generating the linear regression model includes executing the generation of the linear regression model in a case where the difference between the number of the first values and the number of the second values is determined to be equal to or smaller than the threshold.

7. The model generation method according to claim 6, wherein the calculating includes calculating the plurality of values that indicates the distance on a basis of a graph kernel function.

8. The model generation method according to claim 6, wherein the generating the plurality of pieces of data includes generating new data and adding the new data to the plurality of perturbed pieces of data in a case where the value that indicates the uniformity is smaller than the threshold, and the determining includes further determining whether or not a value that indicates uniformity of distribution of a distance between the first data and each of the plurality of perturbed pieces of data to which the new data is added is equal to or greater than a threshold.

9. The model generation method according to claim 6, wherein the calculating includes changing a distance function used to calculate the plurality of values that indicates the distance in a case where the value that indicates the uniformity is smaller than the threshold.

10. The model generation method according to claim 6, the model generation method further comprising: calculating a partial regression coefficient of the linear regression model as a contribution level of a feature included in the plurality of perturbed pieces of data to an output of the machine learning model.

11. A model generation device comprising
a memory; and
processor circuitry coupled to the memory, the processor circuitry being configured to perform processing including:

generating a plurality of perturbed pieces of data as neighborhood data from first data by applying a Local Interpretable Model-agnostic Explanations (LIME) algorithm to the first data to change features of the first data;

obtaining a plurality of values by calculating, for each perturbed piece of data of the plurality of perturbed pieces of data, a value that indicates a distance between the first data and the each perturbed piece of data for generating a weighted linear regression model;

performing a distance uniformity test on a basis of the plurality of values, by determining, for each value of the plurality of values, whether or not the each value is equal to or greater than a threshold; and in a case where the value that indicates the uniformity is determined to be equal to or greater than the threshold, generating a linear regression model by using a result obtained by inputting the plurality of perturbed pieces of data into a machine learning model as an objective variable and using the plurality of perturbed pieces of data as an explanatory variable, wherein the determining includes further determining whether or not a difference between a number of first values and a number of second values included in the result obtained by inputting the plurality of perturbed pieces of data into the machine learning model is equal to or smaller than a threshold, and the generating the linear regression model includes executing the generation of the linear regression model in a case where the difference between the number of the first values and the number of the second values is determined to be equal to or smaller than the threshold.

12. The model generation device according to claim 11, wherein the calculating includes calculating the plurality of values that indicates the distance on a basis of a graph kernel function.

13. The model generation device according to claim 11, wherein the generating the plurality of pieces of data includes generating new data and adding the new data to the plurality of perturbed pieces of data in a case where the value that indicates the uniformity is smaller than the threshold, and the determining includes further determining whether or not a value that indicates uniformity of distribution of a distance between the first data and each of the plurality of perturbed pieces of data to which the new data is added is equal to or greater than a threshold.

14. The model generation device according to claim 11, wherein the calculating includes changing a distance function used to calculate the plurality of values that indicates the distance in a case where the value that indicates the uniformity is smaller than the threshold.

15. The model generation device according to claim 11, the processing further including calculating a partial regression coefficient of the linear regression model as a contribution level of a feature included in the plurality of perturbed pieces of data to an output of the machine learning model.

* * * * *